United States Patent [19]

Takamatsu

[11] Patent Number: 5,718,784
[45] Date of Patent: Feb. 17, 1998

[54] COMBINATION SYSTEM OF PNEUMATIC SEMIRADIAL TIRES FOR FRONT AND REAR WHEELS

[75] Inventor: Tsuyoshi Takamatsu, Tokyo, Japan

[73] Assignee: Bridgestone Corporation, Tokyo, Japan

[21] Appl. No.: 657,347

[22] Filed: Jun. 3, 1996

[30] Foreign Application Priority Data

Jun. 6, 1995 [JP] Japan ................................ 7-139350

[51] Int. Cl.⁶ ........................... B60C 9/06; B60C 9/18
[52] U.S. Cl. ................ 152/528; 152/526; 152/548; 152/554; 152/559
[58] Field of Search ........................ 152/526, 527, 152/528, 535, 548, 554, 559, 558, 209 R, 209 A, 455

[56] References Cited

U.S. PATENT DOCUMENTS

| | | | |
|---|---|---|---|
| 3,515,197 | 6/1970 | Boileau | 152/526 |
| 3,960,194 | 6/1976 | Neale | 152/559 |
| 4,732,194 | 3/1988 | Saneto et al. | 152/526 |

FOREIGN PATENT DOCUMENTS

| | | | |
|---|---|---|---|
| 2-31986 | 2/1990 | Japan | 152/209 R |
| 6-127211 | 5/1994 | Japan . | |

OTHER PUBLICATIONS

B.E. Lindenmuth, "Tire Conicity and Ply Steer Effects on Vehicle Performance", SAE Congress, 740074, Mar. 1974.

*Primary Examiner*—Geoffrey L. Knable
*Attorney, Agent, or Firm*—Sughrue, Mion, Zinn, Macpeak & Seas, PLLC

[57] ABSTRACT

A combination system of pneumatic semiradial tires for front and rear wheels comprises a carcass of two carcass plies and a belt of two belt plies, in which cord extending directions in each of the carcass and the belt are opposite to each other with respect to the equator of the tire between the front tire and the rear tire, and is excellent in the turning performance when the combination system is applied to a racing vehicle running on a circuit course in one-way direction over a greater part of a full running distance.

9 Claims, 3 Drawing Sheets

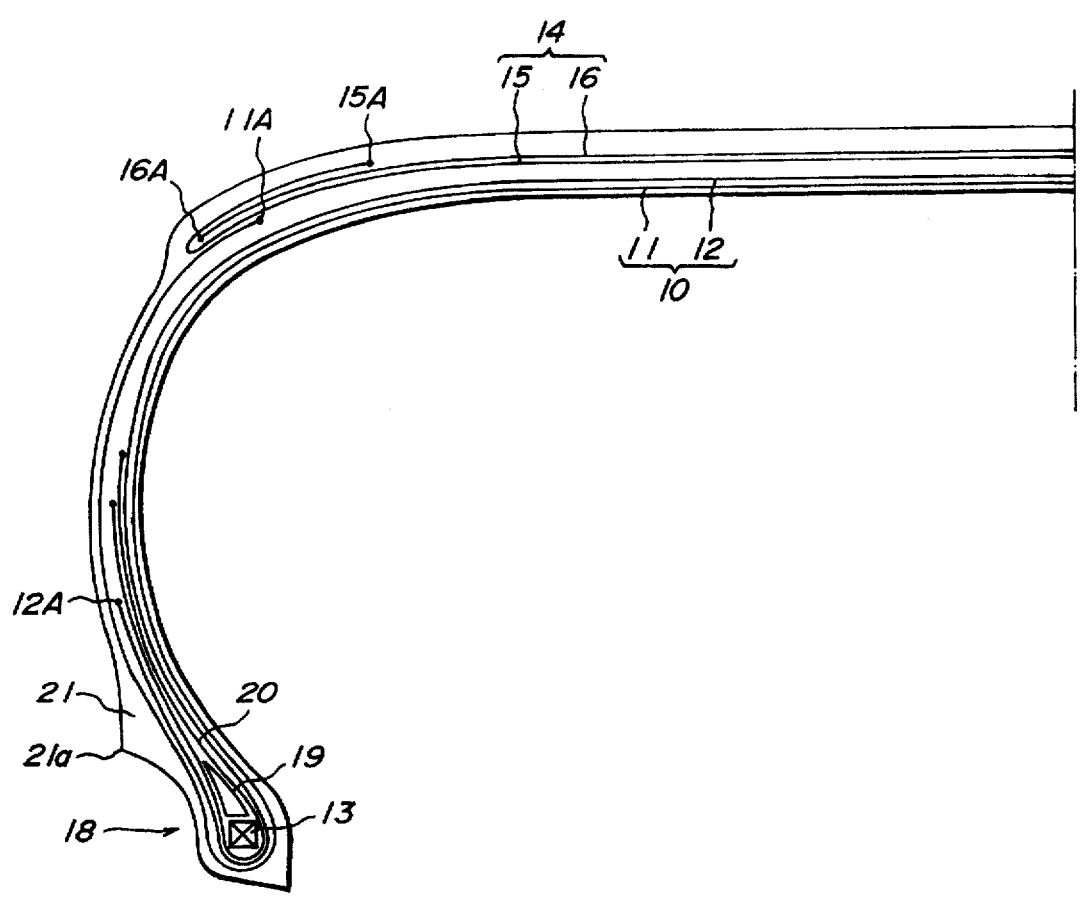
FIG_1

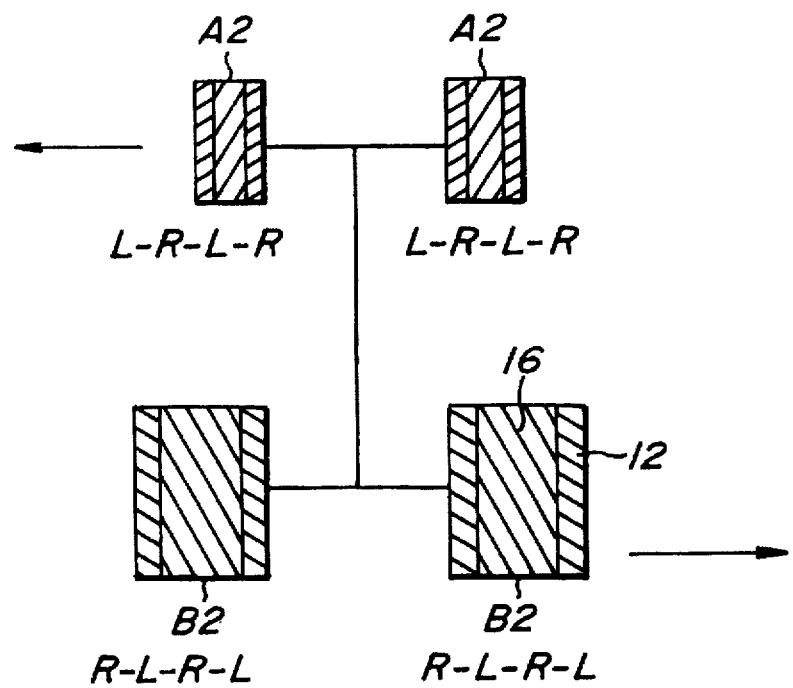
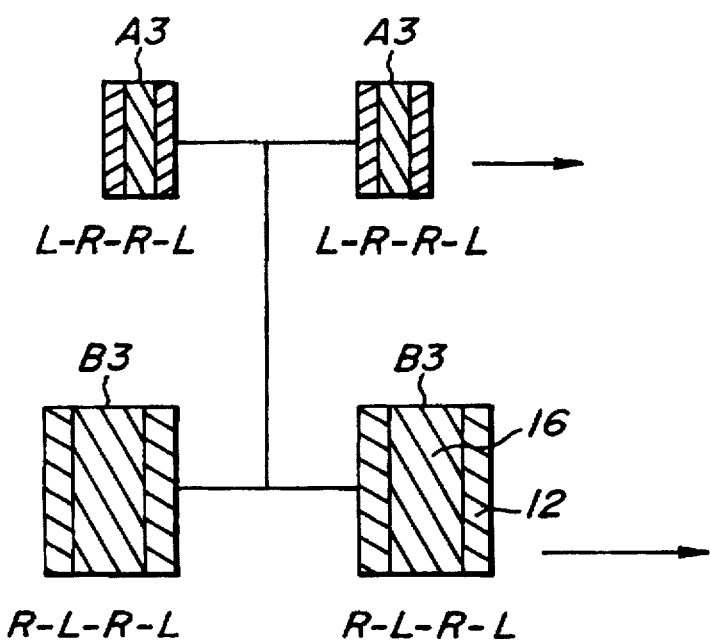

FIG._4
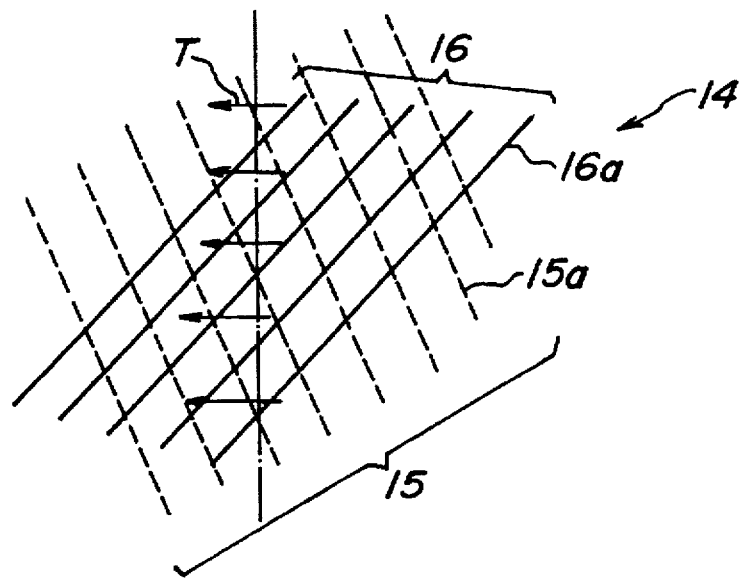
FIG._5
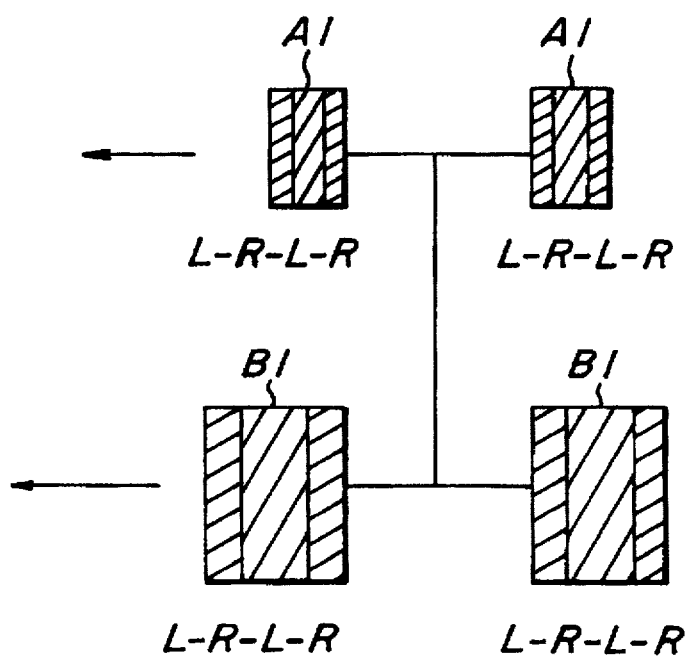

COMBINATION SYSTEM OF PNEUMATIC SEMIRADIAL TIRES FOR FRONT AND REAR WHEELS

BACKGROUND OF THE INVENTION

1. Field of the Invention

This invention relates to a combination system of pneumatic semiradial tires for front and rear wheels applied to a racing vehicle mainly running on a circuit course in one-way direction over a greater part of a full running distance.

2. Description of Related Art

In general, it is known that when the carcass or belt of the tire is comprised of bias plies, steer torque is caused due to the deformation of the tire at ground contact region during running of the tire. This steer torque produces a lateral force called as ply steer force. Considering such a ply steer force of the tire, when the tires are mounted onto a vehicle running on general-purpose road, the tire to be mounted onto a front wheel and the tire to be mounted onto a rear wheel are combined to render the cord extending direction in the carcass ply and the cord extending direction in the belt in the same direction between the front and rear tires, whereby ply steer forces created in the front tires and the rear tires are regulated in the same direction to prevent the self-rotating motion of the vehicle.

However, when the above combination of the front and rear tires is applied to a racing vehicle and mainly run on a circuit course in one-way direction over a greater part of a full running distance different from general-purpose road, use it restrains the turning performance of the vehicle in the one-way direction and hence a forcible handling operation is imposed to a racing driver. Consequently an excessive load is applied to the front and rear tires to promote heat generation of the tire causing tire failure.

SUMMARY OF THE INVENTION

Under the above situations, it is an object of the invention to provide a combination system of pneumatic semiradial tires for front and rear wheels capable of improving the turning performance without imposing a forcible handling operation to the driver when it is applied to a racing vehicle mainly running on a circuit course in one-way direction over a greater part of a full running distance.

According to a first aspect of the invention, there is the provision of a combination system of pneumatic semiradial tires for front and rear wheels, each of which comprising a carcass of two plies containing cords arranged at a cord angle of 45°–80° with respect to an equator of the tire, the cords of which plies being crossed with each other, and a belt of two belt plies superimposed about the carcass ply and containing cords arranged at a cord angle of 10°–35° with respect to the equator of the tire, the cords of which plies being crossed with each other, in which cord extending directions in the carcass ply of these tires with respect to the equator are the same between the two tires located on a wheel shaft among a pair of front and rear wheel shafts but are opposite to each other between the tires located on the front wheel shaft and the tires located on the rear wheel shaft, while cord extending directions in the belt ply of these tires with respect to the equator are the same between the two tires located on a wheel shaft among a pair of front and rear wheel shafts but are opposite to each other between the tires located on the front wheel shaft and the tires located on the rear wheel shaft, and a difference of cord angle between an outermost carcass ply and a belt ply adjacent thereto is at least 30°.

If it is intended to control excessive oversteer, according to a second aspect of the invention, the cord extending directions in the belt ply of the tires are the same between the tires located on the front wheel shaft and the tires located on the rear wheel shaft, which is quite opposite to the first aspect of the invention.

BRIEF DESCRIPTION OF THE DRAWINGS

The invention will be described with reference to the accompanying drawings, wherein:

FIG. 1 is a schematically left-half section view of a pneumatic semiradial tire used in the combination system according to the invention;

FIG. 2 is a schematic plan representation illustrating a first embodiment of the combination system according to the invention;

FIG. 3 is a schematic plan representation illustrating a second embodiment of the combination system according to the invention;

FIG. 4 is a schematic outline illustrating a ply steer force in a tire; and

FIG. 5 is a schematic plan representation illustrating the conventional combination system.

DESCRIPTION OF THE PREFERRED EMBODIMENTS

In order to more improve the turning performance of the tire, the ply steer force may be utilized to create the self-rotating motion in the vehicle. For this purpose, the front tires and the rear tires may be combined to oppose the application direction of the ply steer force created in the front tire to the application direction of the ply steer force created in the rear tire.

The ply steer force is created when the ply is stretched at the ground contact region during the running of the tire. In case of the belt comprised of two belt plies, the belt is subjected to in-plane shearing deformation at the time of contacting with ground so as to return the cords in the outermost belt ply to 0° with respect to the equator of the tire. As a result, the tread is also subjected to in-plane shearing deformation, whereby steer torque is created in the tread in a direction of returning the cords in the outermost belt ply to 0° with respect to the equator. For example, as shown in FIG. 4, a belt 14 is comprised of a first belt ply 15 and a second outermost belt ply 16, in which cords 15a in the belt ply 15 are upward to the left and cords 16a in the belt ply 16 are upward to the right looking at the ground contact state of the tire from above. The steer torque T is applied in a direction of returning the cords 16a in the second belt ply 16 to 0° with respect to the equator or in an anticlockwise direction. The belt is distorted by the torque T to create ply steer force in a left-hand direction in FIG. 4. Moreover, it is known that the application direction of the ply steer force is dependent upon the cord extending direction of the outermost ply in both the carcass and the belt and is particularly influenced by the outermost belt ply. Therefore, if the cords 16a in the second belt ply 16 are upward to the left, the ply steer force is created in a right-hand direction in FIG. 4.

In FIG. 5 is shown application directions of ply steer force created in the front and rear tires during the running of the conventional tire combination system. Moreover, the arrangement of L-R-L-R means cord extending directions of first carcass ply (upward to the left), second carcass ply (upward to the right), first belt ply (upward to the left) and second belt ply (upward to the right) in this order from the left side. Therefore, all of the front tires A1 and the rear tires B1 have the cord extending directions of L-R-L-R. As a result, the application direction of ply steer force in the front tire and the application direction of ply steer force in the rear tire are the same left-hand directions, so that the turning performance during the running on anticlockwise circuit course is considerably poor.

In FIG. 2 is shown application directions of ply steer force created in the front and rear tires when a first embodiment of the combination system according to the invention is applied to a racing vehicle. In this combination system, the cord extending directions of front tires A2 are set to L-R-L-R, while the cord extending directions of rear tires B2 are set to R-L-R-L. As a result, the application direction of ply steer force created in the front tire A2 is a left-hand direction and the application direction of ply steer force created in the rear tires B2 is a right-hand direction as shown in FIG. 2, so that rotation moment of anticlockwise direction is generated in the racing vehicle and hence the turning performance during the running on the anticlockwise circuit course is considerably improved.

In the first combination system according to the invention, there may be caused a case that the ply steer force created in the rear tire is made larger than that in the front tire in accordance with the difference of tire size between the front and rear tires, the difference of dynamic loading between the front and rear tires and the like. If the ply steer force created in the rear tire is too large during turning on the anticlockwise circuit course, it is anticipated to impart an excessive oversteer to the vehicle. In order to control the excessive oversteer to provide adequate turning performance, therefore, it is desirable to use a second embodiment of the combination system according to the invention as shown in FIG. 3.

That is, FIG. 3 shows the application directions of ply steer force created in the front and rear tires when the second embodiment of the combination system according to the invention is applied to the racing vehicle. In this case, the rear tires B3 have the same structure as the rear tires B2 of FIG. 2, while the cord extending directions in the front tires A3 are set to L-R-R-L. Thus, the ply steer force of a right-hand direction created in the belt by extending cords of the second belt ply upward to the left is somewhat offset with the ply steer force of a left-hand direction created in the carcass by extending cords of the second carcass ply upward to the right, and as a result, the magnitude of the ply steer force created in the right-hand direction of the front tire A3 is made small. Therefore, a relatively small rotation moment is applied to the vehicle in the anticlockwise direction based on the difference between the ply steer force created in the front tire A3 and the ply steer force created in the rear tire B3, whereby the excessive oversteer can be controlled to provide adequate turning performance.

The following examples are given in illustration of the invention and are not intended as limitations thereof.

A pneumatic semiradial tire applicable to the combination system according to the invention is shown in FIG. 1. In this tire, numeral 10 is a carcass comprised of a first carcass ply 11 and a second carcass ply 12. The first carcass ply 11 is wound around a bead core 13 from inside of the tire toward outside to form a turnup portion, an end 11A of which turnup portion is located so as to overlap with an end of a belt 14 beneath the belt. The second carcass ply 12 is located on the first carcass ply 11 at a tire crown portion and wound around the bead core 13 from inside toward outside to form a turnup portion, an end 12A of which turnup portion is located inside the turnup portion of the first carcass ply 11 and above an upper end of a bead filler 19 and below a position corresponding to a maximum width of the tire.

The belt 14 is comprised of a first belt ply 15 having a fold belt structure formed by folding both ends 15A of the belt ply outward in the radial direction of the tire and a second belt ply 16 disposed on the belt ply 15 and having a cut end belt structure. In this case, each end 16A of the second belt ply 16 is sandwiched between the first belt ply 15 and its folded portion near to the folded end. In a bead portion 18, a bead reinforcing layer 20 is arranged to envelop the bead core 13 and the bead filler 19 therein. Onto an outer surface of the bead portion 18 may integrally be formed a rim guard 21 having an approximately triangular section shape that a top 21a is located in the vicinity of an upper end of a rim flame (not shown) and a thickness of the rim guard is gradually reduced from the top 21a in up and down directions, in which the rim guard 21 is continuously formed in the circumferential direction of the bead portion.

The semiradial tires having the structure shown in FIG. 1 besides the rim guard are mounted on a racing vehicle according to a combination system shown in FIG. 2 (invention combination system 1), a combination system shown in FIG. 3 (invention combination system 2), or a combination system shown in FIG. 5 (conventional combination system), respectively. Further, the semiradial tires having the same structure as shown in FIG. 1 (i.e. including the rim guard) are mounted onto a racing vehicle according to a combination system shown in FIG. 3 (invention combination system 3). In each of these combination systems, the front tire to be tested has a tire size of 255/50R15, and the rear tire to be tested has a tire size of 355/40R15. Then, evaluation tests for lap time, feeling, tire temperature, tire wearing and high-speed durability are carried out with respect to these combination systems by running the racing vehicle on anticlockwise circuit course. Table 1 shows structural data of the tire used in each of the combination systems. Table 2 shows evaluation results represented by an index value on the basis that the conventional combination system is 100, in which the larger the index value, the better the results of lap time, feeling, tire wearing and high-speed durability, while the smaller the index value, the better the result of tire temperature.

TABLE 1

|  | Name of member | Cord material | Cord angle (°) | Cord extending direction | Initial tensile modulus |
| --- | --- | --- | --- | --- | --- |
| Conventional front combination wheel side system | First carcass ply | 66 nylon | 54 | upward to the left | 350 kgf/mm² |
|  | Second carcass ply | 66 nylon | 54 | upward to the right | 350 kgf/mm² |
|  | First belt ply | Kevlar | 18 | upward to the left | 4000 kfg/mm² |
|  | Second belt ply | Kevlar | 30 | upward to the right | 4000 kfg/mm² |

TABLE 1-continued

| | | Name of member | Cord material | Cord angle (°) | Cord extending direction | Initial tensile modulus |
|---|---|---|---|---|---|---|
| | rear wheel side | First carcass ply | 66 nylon | 54 | upward to the left | 350 kgf/mm² |
| | | Second carcass ply | 66 nylon | 54 | upward to the right | 350 kgf/mm² |
| | | First belt ply | Kevlar | 18 | upward to the left | 4000 kfg/mm² |
| | | Second belt ply | Kevlar | 30 | upward to the right | 4000 kfg/mm² |
| Invention combination system 1 | front wheel side | First carcass ply | 66 nylon | 54 | upward to the left | 350 kgf/mm² |
| | | Second carcass ply | 66 nylon | 54 | upward to the right | 350 kgf/mm² |
| | | First belt ply | Kevlar | 18 | upward to the left | 4000 kfg/mm² |
| | | Second belt ply | Kevlar | 30 | upward to the right | 4000 kfg/mm² |
| | rear wheel side | First carcass ply | 66 nylon | 54 | upward to the right | 350 kgf/mm² |
| | | Second carcass ply | 66 nylon | 54 | upward to the left | 350 kgf/mm² |
| | | First belt ply | Kevlar | 18 | upward to the right | 4000 kfg/mm² |
| | | Second belt ply | Kevlar | 30 | upward to the left | 4000 kfg/mm² |
| Invention combination system 2 | front wheel side | First carcass ply | 66 nylon | 54 | upward to the left | 350 kgf/mm² |
| | | Second carcass ply | 66 nylon | 54 | upward to the right | 350 kgf/mm² |
| | | First belt ply | Kevlar | 18 | upward to the right | 4000 kfg/mm² |
| | | Second belt ply | Kevlar | 30 | upward to the left | 4000 kfg/mm² |
| | rear wheel side | First carcass ply | 66 nylon | 54 | upward to the right | 350 kgf/mm² |
| | | Second carcass ply | 66 nylon | 54 | upward to the left | 350 kgf/mm² |
| | | First belt ply | Kevlar | 18 | upward to the right | 4000 kfg/mm² |
| | | Second belt ply | Kevlar | 30 | upward to the left | 4000 kfg/mm² |
| Invention combination system 3 | | Invention combination system 2 + rim guard for front wheel + rim guard for rear wheel | | | | |

TABLE 2

| | Lap time | Feeling | Tire temperature | Tire wearing | High-speed durability |
|---|---|---|---|---|---|
| Conventional combination system | 100 | 100 | 100 | 100 | 100 |
| Invention combination system 1 | 108 | 110 | 70 | 120 | 130 |
| Invention combination system 2 | 118 | 140 | 65 | 150 | 140 |
| Invention combination system 3 | 123 | 150 | 66 | 152 | 140 |

As seen from Table 2, the combination systems 1-3 according to the invention are considerably excellent in all evaluation items as compared with the conventional combination system.

As mentioned above, when the combination system of the pneumatic semiradial tires according to the invention is applied to a racing vehicle mainly running on a circuit course in one-way direction over a greater part of a full running distance, the turning performance can be improved, and also the more adequate turning performance can be developed in accordance with various racing courses.

What is claimed is:

1. A combination system of pneumatic semiradial tires located on front and rear wheel shafts of a vehicle, each of which tires comprises a carcass of two plies containing cords arranged at a cord angle of 45°–80° with respect to an equator of the tire, the cords of which plies being crossed with each other, and a belt of two belt plies superimposed about the carcass ply and containing cords arranged at a cord angle of 10°–35° with respect to the equator of the tire, the cords of which plies being crossed with each other, in which cord extending directions in the carcass plies of these tires with respect to the equator are the same between the two tires located on each wheel shaft but are opposite to each other between the tires located on the front wheel shaft and the tires located on the rear wheel shaft, while cord extending directions in the belt plies of these tires with respect to the equator are the same between the two tires located on each wheel shaft, and a difference of cord angle between an outermost carcass ply and a belt ply adjacent thereto is at least 30°.

2. A combination system of claim 1 wherein cord extending directions in the belt plies of tires located on the front wheel shaft are opposite to cord extending directions of the tires located on the rear wheel shaft.

3. A combination system of claim 1 wherein the tires located on the front wheel shaft are a different size than the tires located on the rear wheel shaft.

4. A combination system of claim 1 wherein cord extending directions in the belt plies of tires located on the front wheel shaft are the same as cord extending directions of tires located on the rear wheel shaft.

5. A combination system of claim 4 wherein tires located on the front wheel shaft are a different size than the tires located on the rear wheel shaft.

6. A combination system of claim 1 wherein one of said carcass plies has a turn-up portion extending to overlap said belt.

7. A combination system of claim 1 wherein said belt plies comprise one belt ply having a cut end structure and a second belt ply having folded ends such that said one belt ply is sandwiched between said second belt and the folded ends thereof.

8. A combination system of claim 7 wherein one of said carcass plies has a turn-up portion extending to overlap said belt.

9. A combination system of claim 8 wherein each of said carcass plies is wound inside to outside around a bead core.

* * * * *